US012617074B2

(12) United States Patent
Tanaami et al.

(10) Patent No.: US 12,617,074 B2
(45) Date of Patent: May 5, 2026

(54) PICK-UP METHOD, PICK-UP DEVICE, AND PICK-UP SYSTEM

(71) Applicant: SINTOKOGIO, LTD., Nagoya (JP)

(72) Inventors: Yoshikane Tanaami, Nagoya (JP);
Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 36 days.

(21) Appl. No.: 18/935,741

(22) Filed: Nov. 4, 2024

(65) Prior Publication Data

US 2025/0196325 A1      Jun. 19, 2025

(30) Foreign Application Priority Data

Dec. 15, 2023      (JP) ................................. 2023-212376

(51) Int. Cl.
*B25J 9/00*          (2006.01)
*B25J 13/08*        (2006.01)
(52) U.S. Cl.
CPC ........... *B25J 9/0096* (2013.01); *B25J 13/085* (2013.01)
(58) Field of Classification Search
CPC ...... B25J 9/0096; B25J 13/085; B25J 9/1612;

B25J 9/1633; B25J 9/1687; B25J 15/10;
B25J 9/161; B25J 9/1679; B25J 15/0066;
B23P 19/004; B23P 19/06; B23P 19/001;
G05B 2219/45091; G05B 2219/45203;
B65G 47/1421; B65G 47/1478
See application file for complete search history.

(56)               References Cited

U.S. PATENT DOCUMENTS

2016/0023850 A1      1/2016   Kiyama et al.

FOREIGN PATENT DOCUMENTS

JP          2004-223674 A      8/2004
JP          2016-023079 A      2/2016

*Primary Examiner* — Wade Miles
*Assistant Examiner* — James Brian Chin
(74) *Attorney, Agent, or Firm* — Harness, Dickey & Pierce, P.L.C.

(57)                    ABSTRACT

A pick-up method causes (a) a plate having, on an upper surface of the plate, a projection having a columnar shape and (b) a lower surface of a tray to get closer to each other so as to cause the projection and a shaft part to come into contact with each other and to push up a head part to a position upward of an upper surface of the tray, and causes a robot hand to grip the head part.

4 Claims, 4 Drawing Sheets

FIG. 5

PICK-UP METHOD, PICK-UP DEVICE, AND PICK-UP SYSTEM

This Nonprovisional application claims priority under 35 U.S.C. § 119 on Patent Application No. 2023-212376 filed in Japan on Dec. 15, 2023, the entire contents of which are hereby incorporated by reference.

TECHNICAL FIELD

The present disclosure relates to a pick-up method, a pick-up device, and a pick-up system.

BACKGROUND ART

Patent Literature 1 discloses a component transfer system which adjusts a posture of a component having a shaft part and a head part while transferring the component. Patent Literature 2 discloses a work-piece gripping device which is fixed to an arm of a picking robot and which grips, with fingers, a tube housed in a tube rack.

CITATION LIST

Patent Literature

Patent Literature 1

Japanese Patent Application Publication, Tokukai, No. 2016-23079

Patent Literature 2

Japanese Patent Application Publication, Tokukai, No. 2004-223674

SUMMARY OF INVENTION

Technical Problem

Incidentally, depending on some types of components each having a shaft part and a head part, the following may sometimes happen. That is, in a state where such a component is housed in a housing part, a head part thereof does not adequately protrude from the housing part and the head part is hardly gripped.

An aspect of the present disclosure has an object to provide a pick-up method with which a head part of a component can be gripped easily.

Solution to Problem

In order to attain the above object, a pick-up method in accordance with an aspect of the present disclosure is a method with which a robot hand picks up a component from a tray on a basis of control carried out by a control device. The component has a head part and a shaft part extending from the head part. The tray has (a) a recess which is provided to an upper surface of the tray and in which the head part is allowed to be housed and (b) a through-hole which penetrates the tray from the recess to a lower surface of the tray and in which the shaft part is allowed to be housed. The pick-up method includes a first step of causing (a) a plate having, on an upper surface of the plate, a projection having a columnar shape and (b) the lower surface of the tray to get closer to each other so as to cause the projection and the shaft part to come into contact with each other and to push up the head part to a position upward of the upper surface of the tray. The pick-up method further includes a second step of causing the robot hand to grip the head part having been pushed up to the position upward of the upper surface of the tray.

In order to attain the above object, a pick-up device in accordance with an aspect of the present disclosure includes a control device, a tray, a plate, a lifting and lowering part, and a robot hand. The tray has (a) a recess which is provided to an upper surface of the tray and in which a head part of a component whose shaft part extends from the head part is allowed to be housed and (b) a through-hole which penetrates the tray from the recess to a lower surface of the tray and in which the shaft part is allowed to be housed. The plate is disposed downward of the lower surface of the tray, the plate having, on an upper surface of the plate, a projection having a columnar shape. The lifting and lowering part causes the plate or the tray to move up and down. The control device controls the lifting and lowering part to cause the plate and the lower surface of the tray to get closer to each other so as to cause the projection and the shaft part to come into contact with each other and to push up the head part to a position upward of the upper surface of the tray. The control device causes the robot hand to grip the head part thus pushed up.

Advantageous Effects of Invention

In accordance with an aspect of the present disclosure, it is possible to easily grip a head part of a component.

BRIEF DESCRIPTION OF DRAWINGS

FIG. 5 is a view for explaining a pick-up step.

DESCRIPTION OF EMBODIMENTS (Configuration of Pick-up System)

Figure 1:
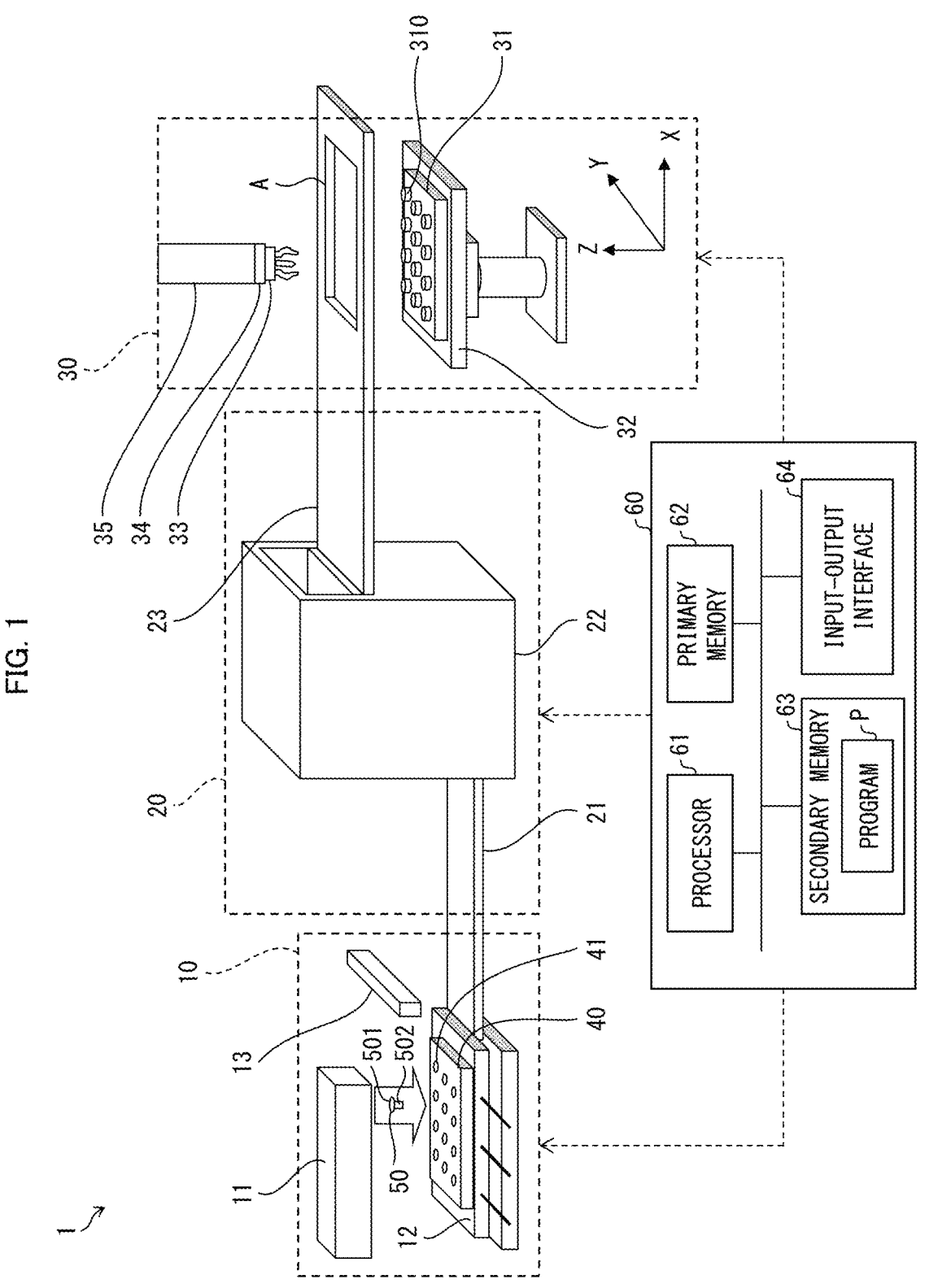
FIG. 1 is a view schematically illustrating a configuration of one example of a pick-up system in accordance with an embodiment of the present disclosure.

FIG. 1 is a view schematically illustrating a configuration of one example of a pick-up system in accordance with an embodiment of the present disclosure. A pick-up system 1 shown in FIG. 1 is a system for picking up, from a tray 40, a vis screw 50 housed in the tray 40.

The vis screw 50 includes a head part 501 and a shaft part 502, and the shaft part 502 extends from the head part 501. The tray 40 is made of, e.g., a soft material such as resin. Thus, even if the vis screw 50 collides with the tray 40, the vis screw 50 is hardly damaged. The tray 40 has, on its upper surface, a plurality of housing parts 41. Each of the housing parts 41 allows a vis screw 50 to be housed therein. The tray 40 will be described in detail later.

The pick-up system 1 includes a housing device 10, a transfer device 20, a pick-up device 30, and a control device 60. The housing device 10 includes a feeder 11, a vibrating conveyor 12, and a scraper 13. The feeder 11 feeds vis screws 50 toward the upper surface of the tray 40 disposed on the vibrating conveyor 12. The vibrating conveyor 12 vibrates the tray 40 up and down. Due to the vibration of the vibrating conveyor 12, the vis screws 50 move on the tray 40. Some of the vis screws 50 fed from the feeder 11 are housed in the housing parts 41. Further, the vibrating conveyor 12 transfers the tray 40 to the transfer device 20. The scraper 13 is disposed at a downstream part of the vibrating conveyor 12. The scraper 13 removes, from the upper surface the tray 40, a vis screw(s) 50 which is/are not housed in any of the housing parts 41 but is/are left on the upper surface of the tray 40.

The transfer device 20 includes a transfer conveyor 21, a transfer elevator 22, and a transfer conveyor 23. The transfer conveyor 21 transfers, to the transfer elevator 22, the tray 40 whose housing parts 41 have the vis screws 50 housed therein. The transfer elevator 22 can hold a given number of trays 40 transferred from the transfer conveyor 21. The transfer elevator 22 sends, to the transfer conveyor 23, part of the trays 40 held by the transfer elevator 22.

The transfer conveyor 23 transfers the tray 40 from the transfer elevator 22 to a predetermined placement part A. The placement part A is a position where a vis screw 50 is to be picked up from the tray 40. In FIG. 1, the placement part A is a hole having a rectangular opening.

In the description below, an X-axis direction, a Y-axis direction, and a Z-axis direction are defined as indicated by the arrows shown in FIG. 1. The X-axis direction and Y-axis direction are directions which are in parallel with two sides of the opening of the placement part A. The Z-axis direction is a direction orthogonal to the opening of the placement part A, and is a so-called up-down direction. The placement part A is a through-hole extending in the up-down direction. The tray 40 is transferred to the placement part A along the X-axis direction. A dimension in the Y-axis direction of the tray 40 is longer than a dimension in the Y-axis direction of the opening of the placement part A. Thus, the tray 40 transferred along the X-axis direction would not fall into the inside of the placement part A. The tray 40 is disposed in the placement part A so as to cover the opening of the placement part A. At this time, in a plan view, all the housing parts 41 of the tray 40 are located inside the opening of the placement part A.

The pick-up device 30 picks up the vis screws 50 from the tray 40 transferred to the placement part A. The pick-up device 30 includes a plate 31, a lifting and lowering part 32, a robot hand 33, a force sensor 34, and a robot arm 35.

The plate 31 has columnar-shape projections 310 which are arranged on an upper surface of the plate 31. The upper surface of the plate 31 has such a shape with which the upper surface of the plate 31 can be inserted into the placement part A from below. The projections 310 are arranged in a similar manner to the housing parts 41 in the tray 40. For example, in a case where 4×3 housing parts 41 are two-dimensionally arranged at given intervals on the upper surface of the tray 40, 4×3 projections 310 are arranged, on the upper surface of the plate 31, at the same intervals as those of the housing parts 41. On an upper part of the lifting and lowering part 32, the plate 31 corresponding to the tray 40 is placed. The lifting and lowering part 32 causes the placed plate 31, placed on the upper part of the lifting and lowering part 32, to move in the Z-axis direction (up-down direction).

The robot hand 33 is provided at a tip end of the robot arm 35. The robot arm 35 is an articulated arm, for example. The robot arm 35 supports the robot hand 33 in such a manner as to be capable of changing a position and a posture of the robot hand 33. The robot hand 33 has a gripping part 330 and a screwdriver 331. The gripping part 330 can grip a head part 501 of a vis screw 50. The screwdriver 331 is one example of a tool. For example, the screwdriver 331 is a Phillips-head screwdriver rotatably provided to the gripping part 330. The force sensor 34 detects a force that the robot hand 33 receives from the vis screw 50.

While causing the screwdriver 331 to rotate with respect to the head part 501 of the vis screw 50 gripped by the gripping part 330, the robot hand 33 detects, via the force sensor 34, a force applied to the robot hand 33 from the head part 501, and attaches the screwdriver 331 to the head part 501 of the vis screw 50. Attaching the screwdriver 331 to the head part 501 of the vis screw 50 means, for example, fitting a cross-shaped tip end of the screwdriver 331, which is a Phillips-head screwdriver, to a cross-shaped hole of the head part 501. In a case where the screwdriver 331 is attached to the head part 501 of the vis screw 50, for example, in a case where the tip end of the screwdriver 331 is properly fitted to the cross-shaped hole of the head part 501, a Z-axis-direction force that the robot hand 33 receives from the vis screw 50 and that is detected by the force sensor 34 is equal to or less than a predetermined threshold Th. In a case where the tip end of the screwdriver 331 is not fitted to the cross-shaped hole of the head part 501, the force F detected by the force sensor 34 exceeds the threshold Th.

The control device 60 includes a processor 61, a primary memory 62, and a secondary memory 63. The processor 61 is constituted by, for example, a central processing unit (CPU). The processor 61 may be constituted by a graphic processing unit (GPU), a digital signal processor (DSP), a micro processing unit (MPU), a floating point number processing unit (FPU), a physics processing unit (PPU), a microcontroller, or a combination of any of them. The primary memory 62 is constituted by, for example, a semiconductor random access memory (RAM). The secondary memory 63 is constituted by, for example, a flash memory, a hard disk drive (HDD), a solid state drive (SSD), an optical disk drive (ODD), or a combination of any of them.

The processor 61 loads, on the primary memory 62, a program P stored in the secondary memory 63. Then, the processor 61 controls, in accordance with a command contained in the program P loaded on the primary memory 62, the parts of the housing device 10, the transfer device 20, and the pick-up device 30. The present embodiment employs a configuration which uses a single processor (processor 61) to control the parts of the pick-up system 1. Note, however, that the present invention is not limited to this. That is, alternatively, a configuration which uses a plurality of processors to control the parts of the pick-up system 1 may be employed. In this case, the plurality of processors which work together to control the parts of the pick-up system 1 may be provided in a single computer and may be configured to be communicable with each other. Alternatively, the plurality of processors which work together to control the parts of the pick-up system 1 may be provided in a respective plurality of computers and may be configured to be communicable with each other over a network. For example, the following configuration can be employed: a processor contained in a computer constituting a cloud server and a processor contained in a computer owned by a user of the cloud server work together to carry out the program P.

Figure 2:
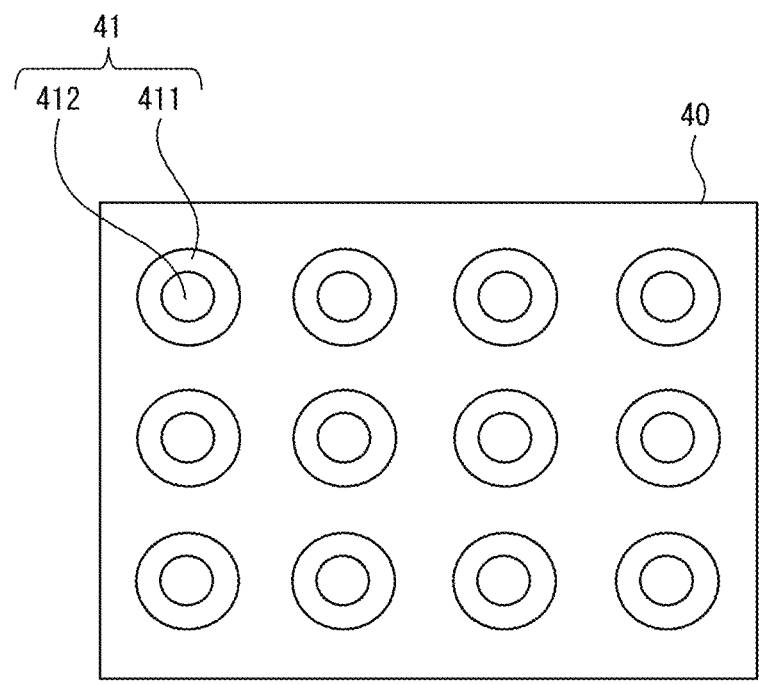
FIG. 2 is a plan view of a tray.
Figure 2:
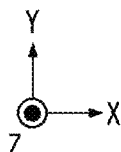

FIG. 2 is a plan view of a tray. In the tray 40 shown in FIG. 2, the housing parts 41 are arranged such that four housing parts 41 are arrayed in the X-axis direction and three housing parts 41 are arrayed in the Y-axis direction two-dimensionally at given intervals. Each of the plurality of housing parts 41 has a recess 411 and a through-hole 412. A diameter of the recess 411 of the housing part 41 is larger than a diameter of the head part 501 of the vis screw 50 shown in FIG. 1, for example. The through-hole 412 penetrates the tray 40 from the recess 411 to a lower surface of the tray 40. A diameter of the through-hole 412 is smaller than the head part 501 of the vis screw 50 and larger than the shaft part 502, for example. In a state where a vis screw 50 is housed in the tray 40, a head part 501 thereof is housed inside a recess 411 and a shaft part 502 thereof is housed inside a through-hole 412. In a state where the head part 501 of the vis screw 50 is housed inside the recess 411, the head part 501 is located downward of the upper surface of the tray 40. Thus, the vis screw 50 housed inside the recess 411 would not be removed from the tray 40 by the scraper 13. In a state where the head part 501 of the vis screw 50 is not housed inside the recess 411, for example, in a state where the shaft part 502 of the vis screw 50 is caught on the recess 411, the vis screw 50 is removed from the tray 40 by the scraper 13. Since the housing parts 41 of the tray 40 are configured to house the vis screws 50 therein so that the head parts 501 of the vis screws 50 are located downward of the upper surface of the tray 40, the housing device 10 of the pick-up system 1 can remove, by the scraper 13, a vis screw(s) 50 which is/are not housed in the housing part 41 but is/are left on the upper surface of the tray 40.

(Pick-up Method)

Figure 3:
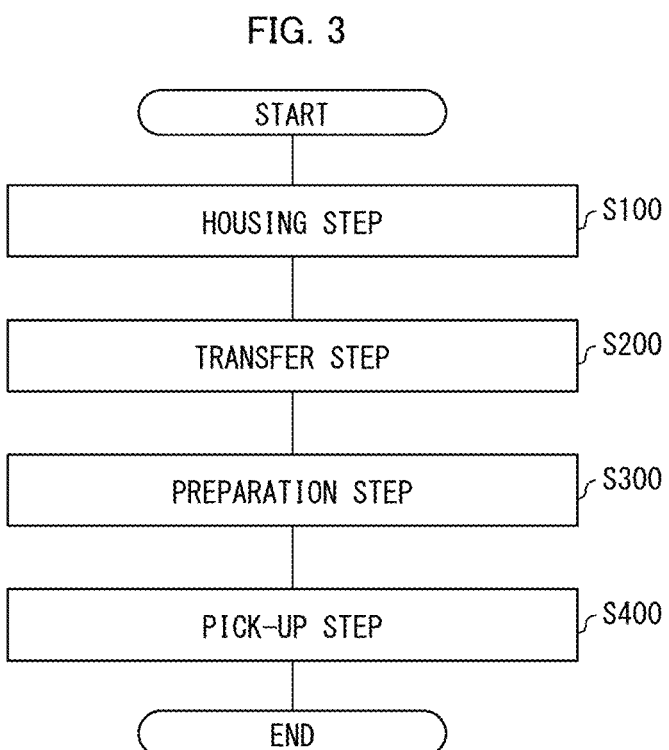
FIG. 3 is a flowchart illustrating a flow of a pick-up method in accordance with an embodiment of the present disclosure.

FIG. 3 is a flowchart illustrating a flow of a pick-up method in accordance with an embodiment of the present disclosure. The pick-up method shown in FIG. 3 can be executed by the control device 60 executing the program P to control the parts of the pick-up system 1. The pick-up method shown in FIG. 3 includes a housing step S100, a transfer step S200, a preparation step S300, and a pick-up step S400.

(Housing Step S100)

In the housing step S100, the housing device 10 causes vis screws 50 to be housed in the housing parts 41 of the tray 40. When the tray 40 is placed on the vibrating conveyor 12, the feeder 11 feeds the vis screws 50 to the upper surface of the tray 40. The vibrating conveyor 12 vibrates the tray 40 for a given period of time, so as to cause the vis screws 50 to move on the tray 40. When a vis screw 50 moves, due to the vibration of the vibrating conveyor 12, to a place where a housing part 41 resides, a shaft part 502 thereof is guided to a through-hole 412 along a recess 411, so that the shaft part 502 is inserted into the through-hole 412. When the shaft part 502 of the vis screw 50 is inserted into the through-hole 412, the head part 501 of the vis screw 50 is housed inside the recess 411.

After the vibrating conveyor 12 vibrates the tray 40 for a given period of time, the vibrating conveyor 12 transfers the tray 40 toward the transfer device 20. The scraper 13 is disposed at a downstream part of the vibrating conveyor 12. The scraper 13 removes, from the tray 40, a vis screw(s) 50 which is/are not housed in any of the housing parts 41 but is/are left on the upper surface of the tray 40. The vis screws 50 removed by the scraper 13 fall onto, for example, a storage box (not illustrated) disposed below the vibrating conveyor 12. The vis screws 50 having fallen onto the storage box are sent back to the feeder 11. The tray 40 is sent from the vibrating conveyor 12 to the transfer device 20. The following description will be given based on the assumption that the vis screws 50 are housed in all the housing parts 41 provided on the upper surface of the tray 40.

(Transfer Step S200)

In the transfer step S200, the transfer device 20 transfers the tray 40 to the placement part A. The transfer conveyor 21 transfers, to the transfer elevator 22, the tray 40 sent from the vibrating conveyor 12. The transfer elevator 22 holds a given number of trays 40. The transfer elevator 22 sends, to the transfer conveyor 23, part of the trays 40 held by the transfer elevator 22. The transfer conveyor 23 transfers the tray 40 from the transfer elevator 22 to the placement part A.

(Preparation Step S300)

Figure 4:
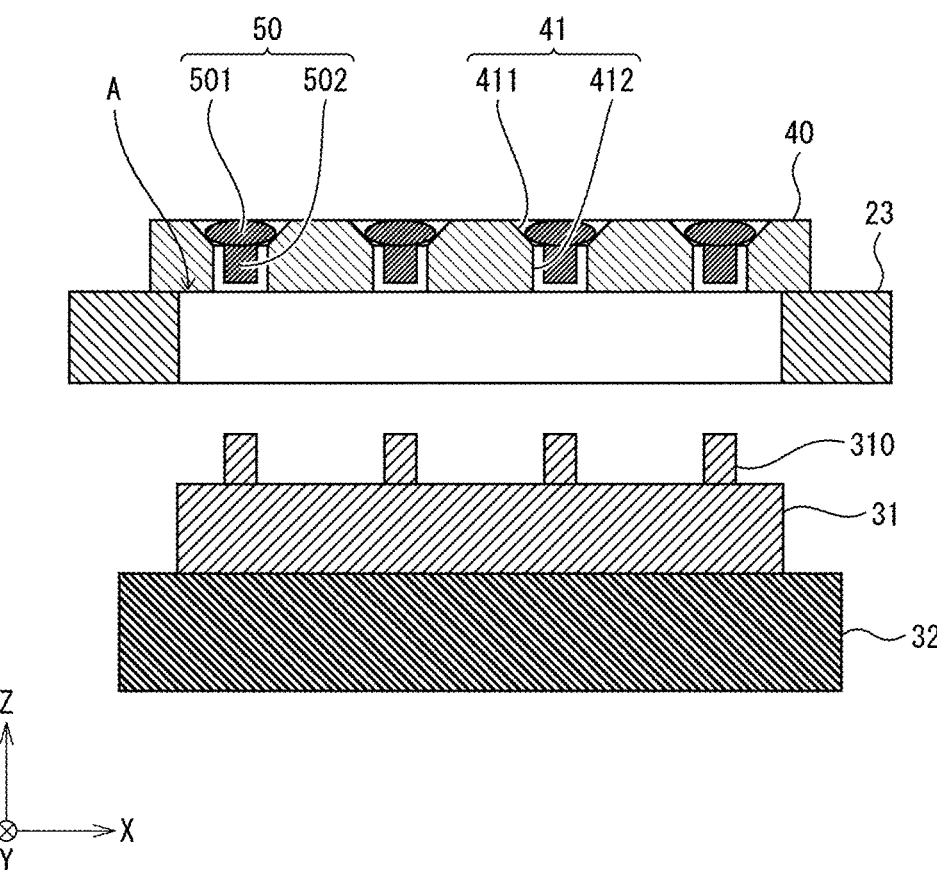
FIG. 4 is a view for explaining a preparation step.

FIG. 4 is a view for explaining the preparation step S300. The preparation step S300 is one example of a first step. In the preparation step S300, preparation for picking up the vis screws 50 by the robot hand 33 is carried out. For example, when the tray 40 is transferred to the placement part A, the lifting and lowering part 32 causes the plate 31 to move upward so that the plate 31 and the tray 40 get closer to each other. The plate 31 enters the placement part A from below, and the projections 310 of the plate 31 and the shaft parts 502 of the vis screws 50 come into contact with each other. After the projections 310 are brought into contact with the shaft parts 502, the lifting and lowering part 32 lifts the plate 31 further upward, so as to lift the vis screws 50 upward. Consequently, the head parts 501 of the vis screws 50 are pushed out of the recesses 411 of the tray 40.

(Pick-up Step S400)

Figure 5:
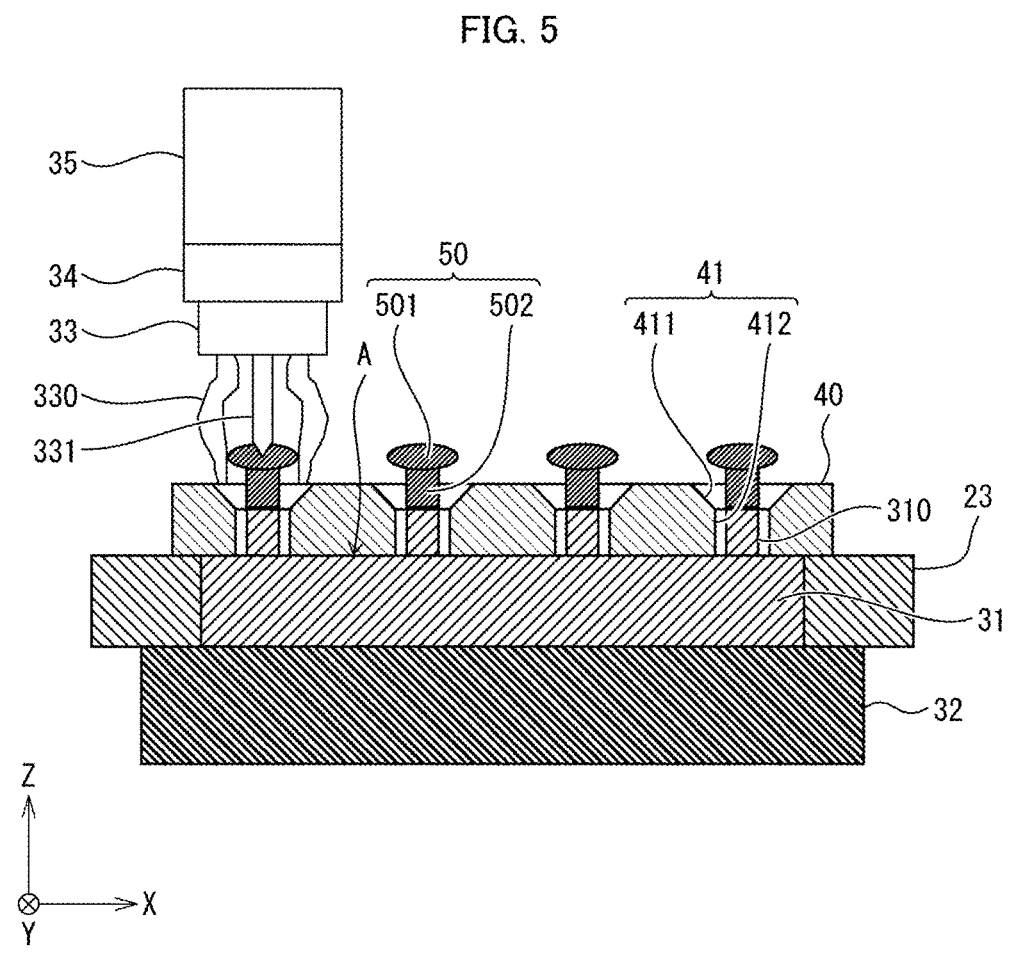

FIG. 5 is a view for explaining the pick-up step S400. The pick-up step S400 is one example of a second step. In FIG. 5, the head parts 501 of the vis screws 50 are being pushed out of the recesses 411 of the tray 40. In the pick-up step S400, the vis screws 50 are picked up by the robot hand 33 from the tray 40. The control device 60 drives the robot arm 35 to cause the robot hand 33 to move a position of one of the housing parts 41 of the tray 40. Then, the control device 60 causes the gripping part 330 of the robot hand 33 to grip a head part 501 of a corresponding one of the vis screws 50. The control device 60 brings the screwdriver 331 into contact with the head part 501 of the vis screw 50, and causes the screwdriver 331 to rotate with respect to the gripping part 330. The control device 60 detects, with the force sensor 34, a Z-axis-direction force F that the robot hand 33 receives from the vis screw 50. For example, the control device 60 stops the screwdriver 331 at a position where the force F detected by the force sensor 34 becomes equal to or less than the predetermined threshold Th. When the force F detected by the force sensor 34 becomes equal to or less than the predetermined threshold Th, the control device 60 determines that the screwdriver 331 is attached to the vis screw 50, and causes the robot hand 33 to move upward to pull the vis screw 50 out of the housing part 41. When the force F detected by the force sensor 34 exceeds the predetermined threshold Th, the control device 60 determines that the screwdriver 331 is not attached to the vis screw 50. When the force F detected by the force sensor 34 does not become equal to or less than the predetermined threshold Th even after the screwdriver 331 is rotated by one or more rounds, the control device 60 may determine that the vis screw 50 is not properly housed in the housing part 41 and may stop picking-up of the vis screw 50. The state where vis screw 50 is not properly housed in the housing part 41 refers to, for example, a state where the shaft part 502 of the vis screw 50 is caught on the recess 411. The vis screw 50 which is not picked up but is left on the tray 40 may be send back to the feeder 11, e.g., by a conveyor for returning.

Variations

In the foregoing embodiment, the tray 40 has, on its upper surface, 12 housing parts 41 arranged two-dimensionally along the X-axis direction and the Y-axis direction. It is only necessary that the tray 40 be provided with at least one housing part 41, and the number of housing parts 41 is not limited to 12. Further, it is not essential that the positions of the housing parts 41 be arranged at equal intervals. Alternatively, the housing parts 41 may be arranged in any shape on the upper surface of the tray 40.

In the description of the foregoing embodiment, in the housing step S100, the vis screws 50 are housed in all the housing parts 41 of the tray 40. However, this is not limitative. In the housing step S100, the control device 60 may control the housing device 10 so that the vis screws 50 are housed in all the housing parts 41 or the control device 60 may send the tray 40 to the transfer device 20 even if the vis screws 50 are not housed in all the housing parts 41 at the time when the tray 40 reaches a downstream position of the vibrating conveyor 12. In the transfer step S200 and the preparation step S300, the control device 60 may determine, for each of the positions of the housing parts 41 of the tray 40, whether or not a vis screw 50 is housed in that housing part 41. For example, an infrared ray or the like may be emitted upwardly to the tray 40; then, a position from which an infrared ray or the like can be received through the housing part 41 may be determined as a position where no vis screw 50 is housed. A light source for emitting an infrared ray or the like may be provided to a tip end of a projection 310 or an area close to a projection 310. Alternatively, the light source may be provided to the robot hand 33, and a light receiving part may be provided to the plate 31. Further, a sensor for detecting contact with a shaft part 502 of a vis screw 50 may be provided to a tip end of a projection 310.

In the description of the foregoing embodiment, the feeder 11 feeds the vis screws 50 toward the upper surface of the tray 40 placed on the vibrating conveyor 12. However, the place where the feeder 11 feeds the vis screws 50 to the upper surface of the tray 40 is not limited to the vibrating conveyor 12. For example, the feeder 11 may feed the vis screws 50 to the upper surface of the tray 40 at a location upstream of the vibrating conveyor 12.

Further, in the description of the foregoing embodiment, after the feeder 11 feeds the vis screws 50 to the tray 40, the vibrating conveyor 12 vibrates the tray 40 at that position for a given period of time, and then transfers the tray 40 to the transfer device 20. However, after the feeder 11 fed the vis screws 50 to the tray 40, the vibrating conveyor 12 may transfer the tray 40 to the transfer device 20 while vibrating the tray 40.

In the description of the foregoing embodiment, in the preparation step, the lifting and lowering part 32 lifts the plate 31 so as to cause the plate 31 and the tray 40 to get closer to each other, thereby causing the projections 310 and the shaft parts 502 of the vis screws 50 to come into contact with each other. However, the method for bringing the projections 310 into contact with the shaft parts 502 is not limited to lifting the plate 31 by the lifting and lowering part 32. Alternatively, for example, a lifting and lowering part provided to a placement part A may lower a plate 31 fixed to a given position of the placement part A so as to change a relative position of the plate 31 with respect to a tray 40.

In the description of the foregoing embodiment, the projections 310 of the plate 31 are arranged similarly to the housing parts 41 of the tray 40. However, this is not limitative. Alternatively, for example, one projection 310 may be provided for a plurality of housing parts 41. In the case where one projection 310 is provided for the plurality of housing parts 41, a tray 40 may be provided with, on its lower surface, a recess configured to be fitted to the one projection.

In the description of the foregoing embodiment, the pick-up device 30 picks up the vis screws 50 from the tray

40. However, the component to be picked up by the pick-up device 30 from the tray 40 only needs to be a component which has a head part and a shaft part extending from the head part, and is not limited to the vis screw. The component to be picked up by the pick-up device 30 may be, for example, a screw, a bolt, a crimp terminal, or the like. In a case where the component to be picked up by the pick-up device 30 is a crimp terminal, a head part thereof refers to a connection part which is to be crimped to a wire or the like and a shaft part thereof refers to a tip end part which is to be inserted into a connector or which is to be fixed to a terminal block. The tool to be provided to the robot hand 33 is not limited to the screwdriver 331, and can be changed to another one in accordance with the component to be picked up. For example, in a case where the component to be picked up is a bolt, the robot hand 33 may have, as the tool, a wrench having a shape conforming to a shape of a head part of the bolt. For another example, in a case where the component to be picked up is a crimp terminal, the robot hand 33 may have a crimp tool for crimping the crimp terminal to an electric wire or the like. On the basis of control carried out by the control device 60, the robot hand 33 may change the tool to another one in accordance with the component to be picked up.

In the description of the foregoing embodiment, the force sensor 34 detects the Z-axis-direction force F that the robot hand 33 receives from the vis screw 50. However, the force sensor 34 may further detect an X-axis-direction force and a Y-axis-direction force that the robot hand 33 receives from the vis screw 50. In the case where the force sensor 34 detects an X-axis-direction force, a Y-axis-direction force, and a Z-axis-direction force (FX, FY, FZ), in the pick-up step S400, if the forces (FX, FY, FZ) become equal to or less than thresholds (ThX, ThY, ThZ) in the respective directions, the control device 60 may determine that the screwdriver 331 is attached to a vis screw 50. If at least one of the forces (FX, FY, FZ) exceeds a corresponding one(s) of the thresholds (ThX, ThY, ThZ) in the respective directions, the control device 60 may determine that the screwdriver 331 is not attached to the screwdriver 50. If the forces (FX, FY, FZ) detected by the force sensor 34 do not become equal to or less than the thresholds (ThX, ThY, ThZ) in the respective directions even after the screwdriver 331 is rotated by one or more rounds, the control device 60 may determine that the vis screw 50 is not properly housed in the housing part 41 and may stop picking-up of the vis screw 50. Further, the force sensor 34 may detect moments (MX, MY, MZ) around the X-axis, Y-axis, and Z-axis. When the tip end of the screwdriver 331 is properly fitted to a cross-shaped hole of a head part 501 of a vis screw 50, a large moment MZ around the Z-axis is detected. Thus, in the pick-up step S400, if the moment MZ around the Z-axis exceeds a given threshold, the control device 60 may determine that the screwdriver 331 is attached to a vis screw 50.

In the description of the foregoing embodiment, in the housing step S100, the housing device 10 causes vis screws 50 to be housed in the housing parts 41 of the tray 40. However, the method for causing the vis screws 50 to be housed in the tray 40 is not limited to the method involving use of the housing device 10, and may be any method.

In the description of the foregoing embodiment, in the transfer step S200, the transfer device 20 transfers the tray 40 to the placement part A. However, the method for transferring the tray 40 to the placement part A is not limited to the method involving use of the transfer device 20, and may be any method.

Items (Item 1) A pick-up method with which a robot hand picks up a component from a tray on a basis of control carried out by a control device, the component having a head part and a shaft part extending from the head part, the tray having (a) a recess which is provided to an upper surface of the tray and in which the head part is allowed to be housed and (b) a through-hole which penetrates the tray from the recess to a lower surface of the tray and in which the shaft part is allowed to be housed, the pick-up method including: a first step of causing (a) a plate having, on an upper surface of the plate, a projection having a columnar shape and (b) the lower surface of the tray to get closer to each other so as to cause the projection and the shaft part to come into contact with each other and to push up the head part to a position upward of the upper surface of the tray; and a second step of causing the robot hand to grip the head part having been pushed up to the position upward of the upper surface of the tray.

According to the above embodiment, the head part of the component is pushed up to the position upward of the upper surface of the tray. This makes it easily grip, with the robot hand, the head part of the component.

(Item 2) The pick-up method described in item 1, wherein: the robot hand includes (a) a gripping part which is configured to grip the component and (b) a tool corresponding to the component; and in the second step, while causing the tool to rotate with respect to the head part gripped by the gripping part, the control device detects, with a force sensor, a force applied to the robot hand from the head part, and causes the tool to be attached to the head part on a basis of the force detected by the force sensor.

According to the above embodiment, the tool is attached to the head part of the component which is gripped. Thus, it is possible to carry out the attachment work quickly after the gripped component is transferred to a given position. This can reduce the number of steps for the attachment work of the component.

(Item 3) A pick-up device including: a control device; a tray having (a) a recess which is provided to an upper surface of the tray and in which a head part of a component whose shaft part extends from the head part is allowed to be housed and (b) a through-hole which penetrates the tray from the recess to a lower surface of the tray and in which the shaft part is allowed to be housed; a plate disposed downward of the lower surface of the tray, the plate having, on an upper surface of the plate, a projection having a columnar shape; a lifting and lowering part which causes the plate or the tray to move up and down; and a robot hand, the control device (a) controlling the lifting and lowering part to cause the plate and the lower surface of the tray to get closer to each other so as to cause the projection and the shaft part to come into contact with each other and to push up the head part to a position upward of the upper surface of the tray and (b) causing the robot hand to grip the head part thus pushed up.

According to the above embodiment, the head part of the component is pushed up to the position upward of the upper surface of the tray. Thus, it is possible to provide a pick-up device with which the head part of the component can be gripped with the robot hand.

(Item 4) A pick-up system including: a pick-up device described in item 3; and a housing device which feeds a component to the upper surface of the tray and causes the component to be housed in the tray.

According to the above embodiment, the head part of the component is pushed up to the position upward of the upper surface of the tray. Thus, it is possible to provide a pick-up system with which the head part of the component can be gripped with the robot hand.

The present disclosure is not limited to the above embodiments, but can be altered in various ways within the scope of the claims. The present disclosure also encompasses, in its technical scope, any embodiment derived by appropriately combining technical means disclosed in differing embodiments.

The invention claimed is:

1. A pick-up method with which a robot hand picks up a component from a tray on a basis of control carried out by a control device, the component having a head part and a shaft part extending from the head part, the tray having (a) a recess which is provided to an upper surface of the tray and in which the head part is allowed to be housed and (b) a through-hole which penetrates the tray from the recess to a lower surface of the tray and in which the shaft part is allowed to be housed, the pick-up method comprising:

a first step of causing (a) a plate having, on an upper surface of the plate, a projection having a columnar shape and (b) the lower surface of the tray to get closer to each other so as to cause the projection and the shaft part to come into contact with each other and to push up the head part to a position upward of the upper surface of the tray; and a second step of causing the robot hand to grip the head part having been pushed up to the position upward of the upper surface of the tray.

2. The pick-up method according to claim 1, wherein:

the robot hand includes (a) a gripping part which is configured to grip the component and (b) a tool corresponding to the component; and in the second step, while causing the tool to rotate with respect to the head part gripped by the gripping part, the control device detects, with a force sensor, a force applied to the robot hand from the head part, and causes the tool to be attached to the head part on a basis of the force detected by the force sensor.

3. A pick-up device comprising:

a control device;

a tray having (a) a recess which is provided to an upper surface of the tray and in which a head part of a component whose shaft part extends from the head part is allowed to be housed and (b) a through-hole which penetrates the tray from the recess to a lower surface of the tray and in which the shaft part is allowed to be housed;

a plate disposed downward of the lower surface of the tray, the plate having, on an upper surface of the plate, a projection having a columnar shape;

a lifting and lowering part which causes the plate or the tray to move up and down; and a robot hand, the control device (a) controlling the lifting and lowering part to cause the plate and the lower surface of the tray to get closer to each other so as to cause the projection and the shaft part to come into contact with each other and to push up the head part to a position upward of the upper surface of the tray and (b) causing the robot hand to grip the head part thus pushed up.

4. A pick-up system comprising:

a pick-up device recited in claim 3; and a housing device which feeds a component to the upper surface of the tray and causes the component to be housed in the tray.

* * * * *